Jan. 3, 1950   F. C. HUTTON   2,493,142
FISHHOOK EXTRACTOR
Filed Sept. 9, 1946
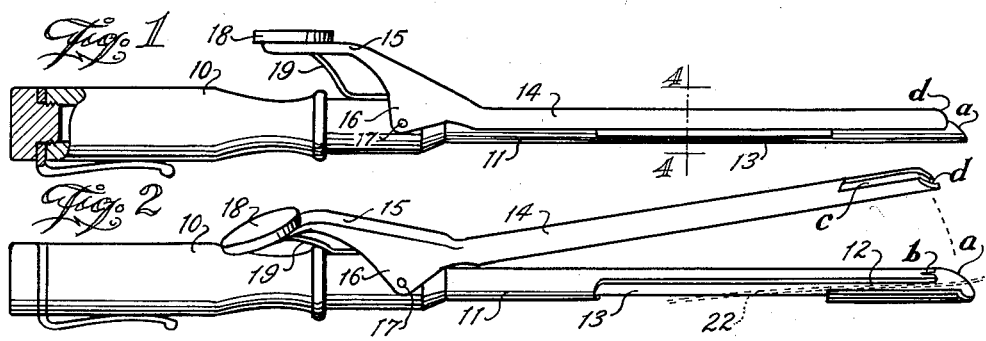
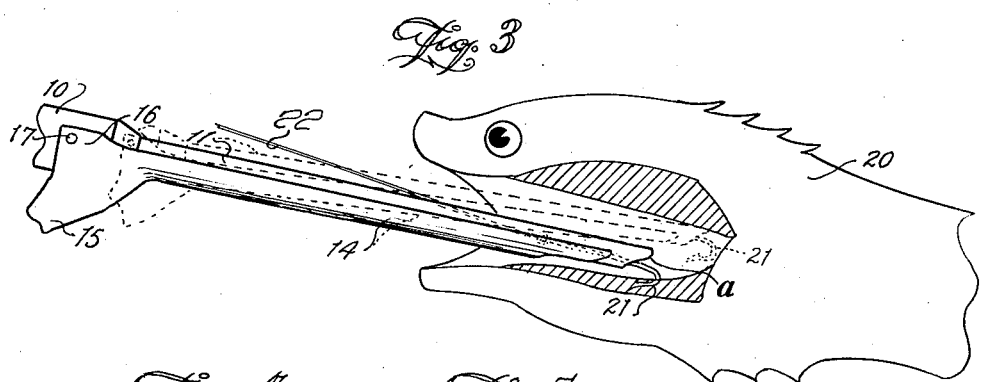
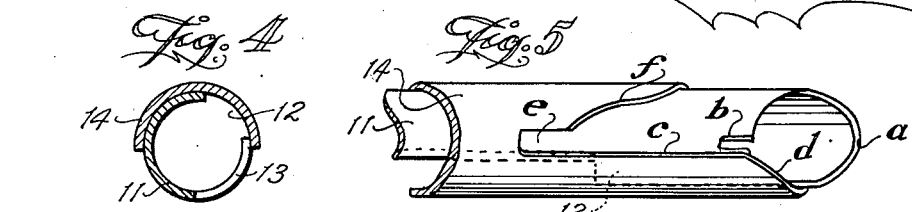
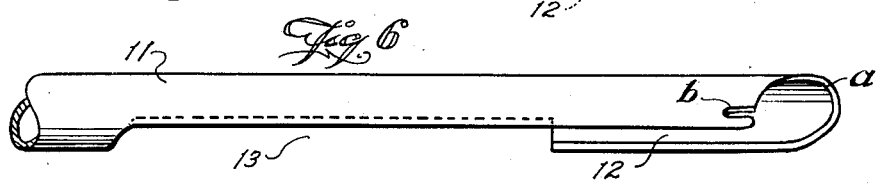
Frederick C. Hutton
INVENTOR.
BY
ATTORNEY Patented Jan. 3, 1950

2,493,142

UNITED STATES PATENT OFFICE 2,493,142

FISHHOOK EXTRACTOR

Frederick C. Hutton, Dallas, Tex.

Application September 9, 1946, Serial No. 695,676

2 Claims. (Cl. 43—29)

This invention relates to fishermen's supplies and equipment and it has particular reference to an instrument for disgorging hooks which have been swallowed by a fish and which cannot be extracted without killing the fish.

The principal object of the invention is to provide a simple instrument by which a hook swallowed by a fish may be extracted with little hazard to the hands of the fisherman who sometimes suffers injury when endeavoring to remove a deep seated hook. Outstanding among the features of the present invention is the fact that it consists of but two major parts which are pivoted together for collapsibility about a line sustaining a fish, with provision in one of the members or parts for guiding the hook and receiving the barbed end thereof, the said members or parts, either in collapsed or extended positions, having no protrusions thereon which would interfere with free and unrestricted advancement of the instrument into the body of the fish or to entangle the line during the operation of disgorging the hook.

With the foregoing and other objects in view, the invention has particular reference to certain features of accomplishment which will become apparent as the description proceeds taken in connection with the accompanying drawing wherein:

Figure 1 is a side elevational view of a fish hook extractor constructed according to the present invention.

Figure 2 is a view similar to Figure 1 but showing the jaws of the instrument slightly displaced to illustrate the manner in which the fishing line is arranged in one of the jaws.

Figure 3 is a detail side elevational view of the instrument, showing the operation of disgorging a hook from a fish.

Figure 4 is a view of the closed jaws of the instrument in transverse section, taken on line 4—4 on Figure 1.

Figure 5 is a fragmentary detail view of the movable jaw of the instrument, and

Figure 6 is a fragmentary plan view of the stationary jaw of the instrument, showing the line receiving slot therein and the hook receiving recess in its end.

Continuing with a more detailed description of the drawing, reference numeral 10 denotes a handle to which is rigidly secured what will be hereinafter termed a stationary jaw 11, said stationary jaw being in axial alignment with the handle 10. The shank of the stationary jaw 11 or that part next adjacent the handle 10 is of tubular shape. This is true also of the forward end of the jaw 11 aside from the fact that it has a slot 12 made longitudinally therein, which slot communicates with an elongated recess 13 intermediate the ends of the said jaw. It is further pointed out that the jaw 11 is formed at an angle or with a radius $a$ at its extremity, at the base of which is formed a recess $b$ which, it will be later explained, receives the hook to be disgorged.

Complementary to the stationary jaw 11 just described is a movable jaw 14 on whose rearward end is formed a lever 15, provided with parallel ears 16, which embrace the end of the handle 10 and are pivoted thereto at 17. A finger rest 18 is affixed to the lever 15 whereby the latter may be depressed against the resistance of a leaf spring 19, underlying said lever 15, to effect displacement of the jaw 14 with respect to the companion jaw 11, in the manner shown in Figure 2, the spring 19 returning the movable jaw to operative relationship with the stationary jaw 11.

An examination of Figures 4 and 5 will disclose that the movable jaw 14 is substantially semi-cylindrical in transverse section and at its forward extremity, there is provided a recess having a straight wall $c$, originating at the arcuated extremity $d$ of the jaw 14 and extending inwardly and terminating in a substantially rectangular recess $e$. The opposite wall of the first recess and identified at $f$ is slightly arcuated and serves as a guide for the barb of the larger hooks in order that that portion next adjacent the barb will fall into the recess $d$ of the stationary jaw 11 after having been guided thereinto by the radius $a$ of the jaw.

In operation, a fish, such as designated at 20 in Figure 3 and which has swallowed a hook 21 is permitted to be suspended by the fishing line 22, thus the line is perpendicular to the ground. While the line 22 is held with one hand, the other hand grasps the instrument by the handle 10 with the thumb pressing downwardly on the lever 15 to displace the jaw 14 with respect to the companion jaw 11. The instrument is manipulated so that the line 22 will fall in the slot 12 of the jaw 11 but will emerge through the slot 13 of the jaw and when the line is so disposed, the lever 15 is released, causing the movable jaw 14 to move into operative position with respect to the jaw 11 under pressure of the spring 19. The instrument is then moved downwardly into the throat of the fish until the end of the jaw 11 engages the hook 21. By virtue of the radius $a$ on the end of the jaw 11, the hook 21 finds its position in the recess b, in which position the barb of the hook is spaced in close relationship to the outer wall of the jaw 11 and upon further downward movement of the instrument, as the fish 20 is held firmly with the other hand which has previously held the line supporting the fish, the hook 21 is displaced from the flesh of the fish but retains its position in the recess b of the jaw 11 while the instrument is withdrawn, but immediately prior to withdrawal, the jaws of the instrument are thrust apart to assume the position shown in Figure 2 so that the barb of the hook will be shielded and will not again engage itself in the flesh of the fish as the instrument is withdrawn.

It is of course necessary to hold the fish 20 stationary while the instrument is moved to displace the hook therein. The operation of removing the hook, in itself, is not fatal to the fish and the latter survives in practically all cases, a fact which is important to the fisherman especially in cases where refrigeration is not immediately available, otherwise the flesh of the fish would quickly deteriorate.

Manifestly, the construction as shown and described is capable of some modification and such modification as may be construed to fall within the scope and meaning of the appended claims is also considered to be within the spirit and intent of the invention.

What is claimed is:

1. An instrument for disgorging fish hooks from fish comprising a handle having a stationary tubular jaw and a semi-cylindrical jaw held against other than pivotal displacement with respect to said stationary jaw, and adapted to receive the same in closed position, said stationary jaw having a beveled operative end and a recess for receiving a fish hook, said stationary jaw further having a slot for receiving the leader of said fish hook, means for urging said semi-cylindrical jaw into closed parallel relationship with said stationary jaw to retain said leader in said stationary jaw and hold the same when said instrument is propelled forwardly to disengage a fish hook from the flesh of a fish for withdrawal therefrom, and means for displacing said semi-cylindrical jaw during withdrawal of said instrument to shield said hook from the flesh of said fish.

2. A device for extracting fish hooks embedded in the internal flesh of a fish, comprising a handle, a stationary tubular jaw on said handle, said stationary jaw having a beveled forward end serving as a guide for an embedded fish hook and further provided with a recess for receiving the bight of said fish hook, and having a slot in said jaw for receiving the line connected to said fish hook, a companion jaw of semi-cylindrical shape connected to said handle and held against other than pivotal displacement with respect to said stationary jaw and adapted to overlie said slot to retain said fish hook in said recess preparatory to withdrawal of said device from a fish, means normally urging said semi-cylindrical jaw into parallel closed relationship with said stationary jaw, and means for displacing said semi-cylindrical jaw to prohibit reengagement of the hook with the flesh of said fish as said device is withdrawn therefrom.

FREDERICK C. HUTTON.

REFERENCES CITED

The following references are of record in the file of this patent:

UNITED STATES PATENTS

| Number | Name | Date |
|---|---|---|
| 1,728,864 | Kramer | Sept. 17, 1929 |
| 2,294,758 | Manski | Sept. 1, 1942 |